Nov. 18, 1958  J. W. HEBERT  2,860,626
REMOVABLE GRATE ACTUATOR AND BEARINGS
Original Filed May 29, 1953  2 Sheets-Sheet 1
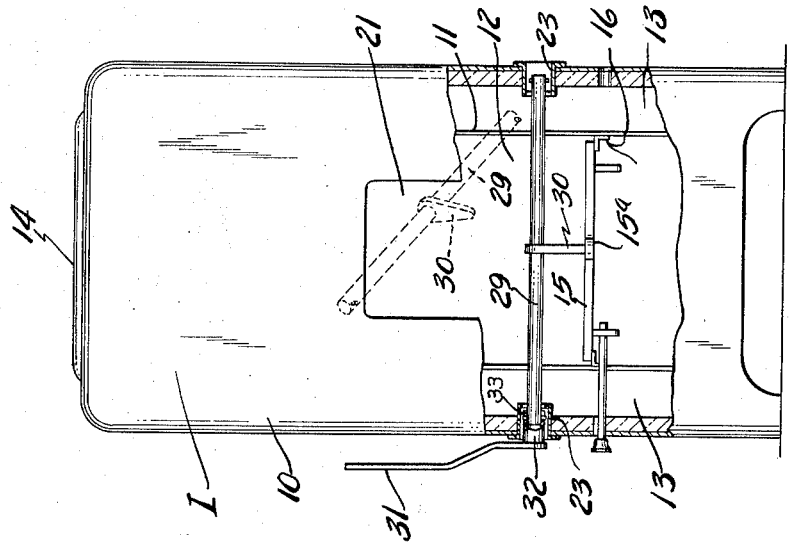
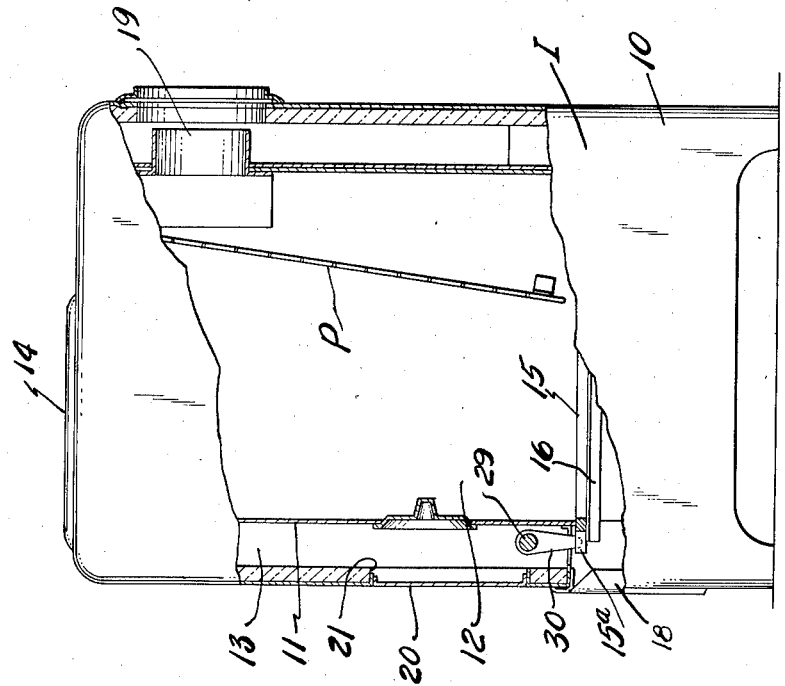
INVENTOR
John W. Hebert
BY Fearman + Fearman
ATTORNEYS.

Nov. 18, 1958  J. W. HEBERT  2,860,626
REMOVABLE GRATE ACTUATOR AND BEARINGS
Original Filed May 29, 1953  2 Sheets-Sheet 2
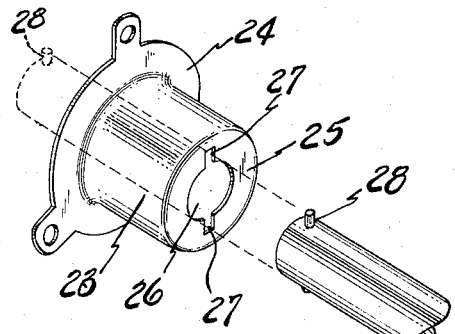
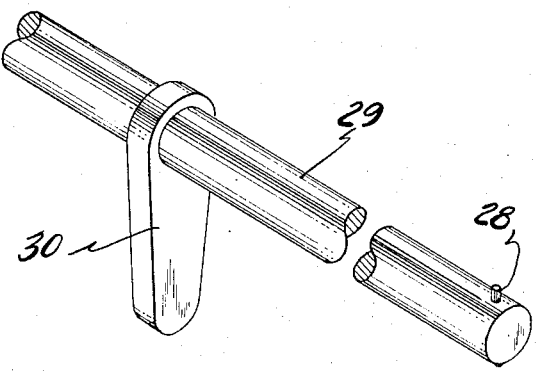
Fig. 3
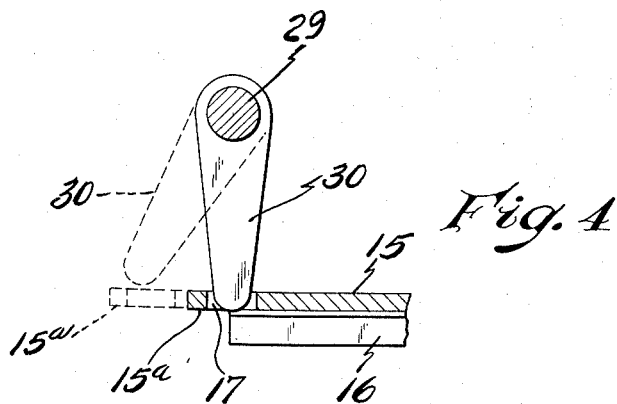
Fig. 4
INVENTOR
John W. Hebert
BY Fearman & Fearman
ATTORNEYS.

United States Patent Office 2,860,626
Patented Nov. 18, 1958

2,860,626

REMOVABLE GRATE ACTUATOR AND BEARINGS

John W. Hebert, Bay City, Mich., assignor to Calcinator Corporation, Bay City, Mich.

Original application May 29, 1953, Serial No. 358,476, now Patent No. 2,790,401, dated April 30, 1957. Divided and this application December 7, 1953, Serial No. 396,681

9 Claims. (Cl. 126—169)

This invention relates to knockdown, quickly removable grate actuator assemblies for use in household incinerators and garbage disposal units wherein reciprocable grates are employed.

One of the prime objects of the invention is to design manually operated actuating means for the reciprocable grates of incinerators which can be removed from an incinerator casing without disassembling the casing or the bearings which support said actuating means.

Another object of the invention is to provide grate actuating means of simple and practical design which can be very easily and quickly removed from an incinerator casing, when for any reason it is desired to replace or repair said actuating means, or gain unobstructed access to various other component parts of the incinerator.

A further object of the invention is to design a quickly removable grate actuator assembly of rugged and durable construction, which is highly efficient and reliable in operation and will not become disengaged, but which is readily separable when desired to permit the shaker shaft thereof to be removed through the burner access opening in the front wall of the incinerator housing.

A still further object of the invention is to design a grate actuating assembly which can be simply and economically manufactured and installed in an incinerator casing.

With the above and other objects in view, the present invention consists in the combination and arrangements of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a side elevational view of an incinerator, a portion thereof being broken away to show the interior arrangement.

Fig. 2 is a front elevational view of an incinerator casing with a portion thereof broken away to show my grate assembly and actuating means, the broken lines indicating the manner in which the shaker shaft assembly is removed through the panel opening in the front wall of the casing.

Fig. 3 is a perspective view of the shaker shaft, lever, and one of the pressed bearings, the broken lines showing the shaft extending through one of the bearings as is necessary to effect removal.

Fig. 4 is an enlarged, transverse sectional view showing the shaft and grate, the broken lines showing the grate movement and the manner of disengaging the lever from the grate.

The instant application is a divisional application directed to the grate actuating assembly which is shown and described in my co-pending application Serial No. 358,476, filed May 29, 1953, now Patent Number 2,790,401, dated April 30, 1957, for a Sectional Dumping Grate.

Referring now more specifically to the accompanying drawings and particularly to Figs. 1 and 2 thereof, a letter I generally indicates a household incinerator unit of the type shown and described in the above-identified application. This incinerator unit is of downdraft design and includes an insulated housing or outer casing 10 which is provided with an inner casing 11, constituting a combustion chamber 12, the walls of the inner casing 11 being spaced from the walls of the outer casing to define a perimetrical insulating and air conducting passage 13 therearound.

Openings (not shown) are provided in the lower portion of the outer casing 10 to permit air to enter the passage 13 and flow upwardly to openings (not shown) in the upper portion of the inner casing 11, and thence downwardly into the combustion chamber 12 as usual.

A charging door 14 is provided in the top wall of the outer casing 10 and forms an openable closure so that refuse, garbage, trash and the like can be placed in the combustion chamber.

A perforated grate 15 forms the bottom of the inner casing 11 and is supported for reciprocable sliding movement on tracks 16 which are secured to the side walls of the inner casing in any desired manner. A projecting lug 15a is cast integral with the front edge of the grate 15 and projects into the passage 13, said lug being provided with an opening 17 therein for a purpose to be presently described. An ash drawer 18 is removably mounted under the grate 15 and ashes and other debris fall thereinto as the grate is actuated.

A rearwardly inclined partition P is provided in the combustion chamber as shown, and flue means 19 forms a passage for delivery of smoke and products of combustion to a chimney or stack (not shown). Conventionally, a removable front panel 20 is mounted in an opening 21 in the front wall of the incinerator so that access may be had to the burner unit (not shown), which is mounted in the front wall of the inner casing 11, and it is through this opening that the grate actuating means which I will now describe is inserted or removed. The structure thus far described is conventional and forms no part of the instant invention.

Provided in opposed openings in the side walls of the incinerator housing 10 are identical, pressed metal, tubular bearings 23 open at their outer ends and formed with flanges 24 permitting them to be easily secured to the side walls of the housing. The inner end walls 25 of the bearings 23 are provided with substantially circular bearing openings 26 and opposed slots 27 open thereinto, said slots permitting entrance of the pins 28 provided in the end sections of the shaker shaft 29 when the shaft is placed in position. The ends of the shaft 29 are revolvably supported by the marginal walls of the openings 26 and as will be seen, a depending crank leg 30 is mounted centrally on the shaft 29 and projects into the opening 17 provided in the grate extension or lug 15a.

A handle 31 is provided with a laterally extending sleeve 32 which extends into the open end of either of the bearings 23 and fits over the one end of the shaft 29, the sleeve 32 having opposed slots 33 extending from the free end of the sleeve to accommodate the pins 28 which are mounted on the end sections of the shaft 29.

When it is desired to reciprocate the grate to shake the ashes therefrom, the operator merely inserts the sleeve 32 of the shaker handle 31 into one of the bearings 23 and aligns the slots 33 with the pins 28 so that the sleeve 32 can be fitted over the end of the shaker shaft 29. Rocking of the shaft 29 by manipulating the handle 31 moves the grate 15 back and forth and thus shaking the accumulated ashes and other debris into the ash pan.

When it is desired to remove the shaker rod 29 from the incinerator, the handle 31 is first swung rearwardly to rotate the shaker shaft and lever sufficiently to disengage the lever from the opening in the grate. The handle is then removed, after which the shaft 29 is moved laterally in one direction to remove one end thereof from one of the bearings 25, all as indicated by the broken lines in Fig. 2 of the drawings. The shaft 29 can then be tilted and the opposite end thereof removed from its bearing 25 whence it can be passed endwise through the opening 21 in the housing of the incinerator normally closed by the panel 20. To reassemble, it is merely necessary to reverse the steps above described.

It will thus be readily apparent that I have perfected a grate actuator assembly which not only can be quickly replaced or repaired, but promotes the easy maintenance and repair of various other elements of the incinerator, since it can be readily removed to permit access thereto.

It is to be understood that the instant descriptive matter is intended as illustrative rather than limiting and that various equivalent changes may be made in the various elements of the device without departing from the spirit of the invention or the scope of the appended claims.

What I claim is:

1. In an incinerator including a casing with an access opening therein, a grate mounted for ash removing movement in said chamber, spaced apart bearing surfaces in said casing, an actuating shaft supported by said bearing surfaces and including means in releasable engagement with said grate to actuate the same on movement of said shaft, means preventing axial displacement of the shaft except when the latter is in a predetermined angular position relative to the bearing surfaces, said shaft being of a length substantially less than the spaced distance between the outer ends of the bearing surface and displaceable axially therein sufficiently so that first one end and then the other end of said shaft may be disengaged from said bearing surfaces.

2. The combination defined in claim 1 in which at least one of the bearing surfaces extends through the wall of the casing and is open at its outer end.

3. In an incinerator including a casing with an access opening therein, spaced apart bearing surfaces on said casing, an actuating shaft of greater length than the distance between said surfaces supported on said surfaces, at least one of the bearing surfaces having an outer end spaced a substantial distance from the outer end of the shaft it supports, actuating means on said shaft spaced from said bearing surfaces and blocking continuous axial withdrawal of said shaft in either direction past said bearing surfaces, said shaft being slidable axially therein a sufficient distance relative to the length of the shaft, the distance between the bearing surfaces, and the distance between the actuating means and bearing surfaces so that first one end and then the other end of said shaft may be axially disengaged from the inner ends of said bearing surfaces and the shaft removed.

4. In an incinerator including a casing with an access opening therein, spaced apart bearing surfaces supported by opposite walls of said casing, an actuating shaft of greater length than the distance between said surfaces supported by said surfaces and slidable axially therein, said bearing surfaces substantially surrounding the ends of said shaft so that the ends cannot be lifted out of them, said shaft being of a predetermined length relative to the distance between said walls so as to be accommodated within said casing upon disengagement from said bearing surfaces and being slidable axially relative to said bearing surfaces a sufficient distance relative to the length of the shaft and the distance between the surfaces so that first one end and then the other end of said shaft may be axially disengaged from the inner ends of said bearing surfaces within the casing and the shaft removed out said access opening.

5. The combination with an incinerator having a casing with an access opening therein of, an actuating shaft in said casing, and spaced apart bearing surfaces in said casing supporting said shaft, said bearing surfaces substantially surrounding the ends of said shaft so that the ends cannot be lifted out of them, said shaft being of a length sufficiently less than the spaced distance between the outer ends of the bearing surfaces and slidable axially in the bearing surfaces so as to be displaceable axially therein sufficiently so that first one end and then the other end of said shaft may be disengaged from said bearing surfaces and the shaft removed out said access opening.

6. The combination with an incinerator having a casing with an access opening therein and a grate mounted for ash removing movement in said casing of, spaced apart bearing surfaces on opposite walls of said casing, a shaker shaft with its ends supported by said bearing surfaces, said bearing surfaces substantially surrounding the ends of said shaft so that the ends cannot be lifted out of them, actuating means normally fast on said shaft spaced from said bearing surfaces and blocking continuous axial withdrawal of said shaft in either direction past said bearing surfaces, said means being in releasable engagement with said grate and shaking the grate on actuation of said shaft, said shaft being of less length than the distance between said walls and being slidable axially in said bearing surfaces a sufficient distance relative to the length of the shaft, the distance between the bearing surfaces, and the distance between the actuating means and bearing surfaces so that first one end and then the other end of said shaft may be axially disengaged from the inner ends of said bearing surfaces and the shaft may be removed out said access opening.

7. In an incinerator including a casing with an access opening therein; a grate mounted for ash removing movement in said casing; a shaker shaft in engagement with said grate to actuate the same on movement of said shaft; spaced apart bearings in said casing for supporting only the ends of the shaft, including means provided on the bearings restraining movement of said shaft relative to said bearings except axial and rotary movement; said means on said bearings restraining all but certain movement of the shaft being axially spaced relative to the length of the shaft so that first one and then the other end of said shaft may be axially disengaged from said bearings upon axial movement of the shaft within the casing and the shaft removed out said access opening.

8. In an incinerator including a casing with an access opening therein; a grate mounted for ash removing movement in said casing; spaced apart bearings in said casing; a shaker shaft supported by said bearings for substantial axial movement in said bearings; means on said bearing surfaces and shaft preventing axial movement of said shaft except when said shaft is in a particular rotated angular position relative to said bearing surfaces; means provided on said bearings restraining movement of said shaft relative to said bearings except said axial and rotary movement; said means on said bearing surfaces restraining all but certain movement of the shaft being axially spaced relative to the length of the shaft so that first one end and then the other end of said shaft may be disengaged from the bearing surfaces axially upon axial movement of the shaft and the shaft removed out said access opening.

9. In an incinerator including a casing with an access opening therein; a grate mounted for reciprocating movement in said casing; spaced apart tubular bearings in said casing; a shaker shaft including means in engagement with the grate to actuate the same on movement of the shaft; said bearings having inner end walls with substantially centrally disposed openings therein to accommodate and support the ends of the shaft in a manner to permit axial movement thereof, at least one of the opposite outer ends of said bearings being open; a handle sleeve insertable through the outer end of said one of said bearings in driving engagement with the shaft and operable to rock the same and actuate said grate; pins provided adjacent the ends of said shaft, the end walls of the bearings having slots in communication with said openings to permit passage of the ends of the shaft out of the bearings on axial movement of said shaft so that the shaft can be removed from said bearings, said sleeve having a slot therein open to the inner end thereof to accommodate one of said pins so that rotation of said sleeve rocks said shaft.

References Cited in the file of this patent

UNITED STATES PATENTS

| | | |
|---|---|---|
| 314,108 | Cissell | Mar. 17, 1885 |
| 767,039 | Buller | Aug. 9, 1904 |
| 846,015 | Demarest | Mar. 5, 1907 |
| 901,485 | Schafer | Oct. 20, 1908 |
| 1,156,691 | Kahn | Oct. 12, 1915 |
| 1,457,517 | Fulghum | June 5, 1923 |
| 1,547,168 | Hance | July 28, 1925 |
| 2,469,634 | Curtiss | May 10, 1949 |
| 2,488,702 | Brockstein | Nov. 22, 1949 |

FOREIGN PATENTS

| | | |
|---|---|---|
| 180,394 | Canada | Nov. 13, 1917 |